United States Patent
Jung et al.

(10) Patent No.: US 8,440,351 B2
(45) Date of Patent: May 14, 2013

(54) POSITIVE ELECTRODE FOR LITHIUM ION SECONDARY BATTERY AND LITHIUM ION SECONDARY BATTERY INCLUDING SAME

(75) Inventors: Won-Il Jung, Suwon-si (KR); Akira Takamuku, Osaka (JP); Hideaki Maeda, Osaka (JP); Naoya Kobayashi, Osaka (JP)

(73) Assignee: Samsung SDI Co., Ltd., Yongin-si (KR)

( * ) Notice: Subject to any disclaimer, the term of this patent is extended or adjusted under 35 U.S.C. 154(b) by 657 days.

(21) Appl. No.: 12/625,677

(22) Filed: Nov. 25, 2009

(65) Prior Publication Data

US 2010/0151326 A1    Jun. 17, 2010

(30) Foreign Application Priority Data

Nov. 28, 2008    (JP) ................................ 2008-305718
Nov. 20, 2009    (KR) ........................ 10-2009-0112855

(51) Int. Cl.
*H01M 4/50* (2010.01)
(52) U.S. Cl.
USPC ........................................................ 429/224
(58) Field of Classification Search .................. 429/224
See application file for complete search history.

(56) References Cited

U.S. PATENT DOCUMENTS

| | | |
|---|---|---|
| 6,287,727 B1 | 9/2001 | Horie et al. |
| 7,087,348 B2 | 8/2006 | Holman et al. |
| 2006/0068289 A1 | 3/2006 | Paulsen et al. |

FOREIGN PATENT DOCUMENTS

| | | |
|---|---|---|
| JP | 2007-213866 | 8/2007 |
| KR | 10-2004-0063554 | 7/2004 |
| KR | 10-2006-0084886 | 7/2006 |
| KR | 10-2007-0016431 A | 2/2007 |
| KR | 10-2007-0008115 | 7/2007 |

OTHER PUBLICATIONS

KIPO Office action dated Jul. 20, 2011 in the priority Korean application No. 2009-0112855, pp. 1-4.
KIPO Notice of Allowance dated May 20, 2012, for Korean priority Patent application 10-2009-0112855,(5 pages).
Patent Abstracts of Japan, and English machine translation of Japanese Publication 2007-213866 listed above (26 pages).

*Primary Examiner* — Stuart Hendrickson
(74) *Attorney, Agent, or Firm* — Christie, Parker & Hale, LLP

(57) ABSTRACT

A rechargeable lithium ion battery including a positive electrode a positive active material and including a negative electrode having a negative active material. The positive active material includes a lithium-manganese-based compound core and a heat resistant polymer disposed on the lithium-manganese-based compound core. The heat resistant polymer has a glass transition temperature (Tg) ranging from about 80 to about 400° C.

Alternatively, the positive active material may include a lithium-manganese-based compound core and an inorganic metal compound as well as the heat resistant polymer with a glass transition temperature (Tg) ranging from about 80 to about 400° C. disposed on the lithium-manganese-based compound core.

19 Claims, No Drawings

POSITIVE ELECTRODE FOR LITHIUM ION SECONDARY BATTERY AND LITHIUM ION SECONDARY BATTERY INCLUDING SAME

CROSS-REFERENCE TO RELATED APPLICATIONS

This application claims the benefit of Japanese Patent Application No 2008-305718, filed in the Japanese Property Office on Nov. 28, 2008, and Korean Patent Application No. 2009-0112855, filed in the Korean Intellectual Property Office on Nov. 20, 2009, the disclosures of which are incorporated herein by reference.

BACKGROUND

1. Field

Aspects of these disclosures relate to a positive electrode for a rechargeable lithium ion battery and a rechargeable lithium ion battery including the same.

2. Description of the Related Art

Recently, because a rechargeable lithium ion battery that can be used for a mobile phone, a laptop computer, or the like has been required to be of much higher capacity, there has been an attempt to obtain high-capacity and high energy density by setting a high charge, which results in an improved utilization ratio of the positive electrode.

For example, when a lithium manganese-based oxide such as $LiMn_2O_4$ or the like is used as a positive active material, it may be deposited into manganese metal by an insertion reaction of lithium ions accompanied by charge and discharge. However, when the manganese metal is deposited and accumulated in a negative electrode, the rechargeable lithium ion battery may exhibit deteriorated cycle characteristics due to destruction of the separator or degradation of the negative electrode.

That is, when a metal is eluted from the positive active material, the metal may be deposited on the negative electrode or oxidize the separator, thus degrading the rechargeable lithium ion battery. Since this elution of transition elements may become severe at a high voltage and a high temperature, it may bring about severe deterioration of a positive electrode at a high voltage and a high temperature. This deterioration may increase impedance (resistance) of a rechargeable lithium ion battery, causing its cycle characteristics to deteriorate.

In order to solve this problem, a method of suppressing degradation of an electrolyte solution, a negative electrode, or a separator by interposing an aramid resin (wholly aromatic polyamide resin) layer between a positive electrode and the separator has been suggested. However, this method cannot suppress a metal from being eluted from portions of the positive active material inside the positive electrode where those portions are not in contact with the aramid resin layer.

SUMMARY

Aspects of this disclosure provide a positive electrode for a rechargeable lithium ion battery capable of stably maintaining a positive active material even though the rechargeable lithium ion battery is charged and discharged at a high voltage and a high temperature but still maintains excellent cycle characteristics.

Aspects of this disclosure also provide a rechargeable lithium ion battery including the positive electrode.

One aspect of this disclosure provides a positive electrode for a rechargeable lithium ion battery where the positive electrode includes a positive active material and a negative electrode where the negative electrode includes a negative active material. The positive electrode includes a lithium-manganese-based compound core and a heat-resistant polymer disposed on the lithium-manganese-based compound core, and the heat resistant polymer has a glass transition temperature (Tg) ranging from about 80 to about 400° C.

The heat resistant polymer may be selected from the group consisting of a polyamide (PA) resin, a polyimide (PI) resin, a polyamideimide (PAI) resin, a polyacrylonitrile (PAN) resin, a polysulfone (PS) resin, a polybenzimidazole, a polytetrafluoroethylene (PTFE) resin, or a copolymer or combination thereof. The polyamide resin may be a wholly aromatic polyamide-based resin. The heat resistant polymer may be included in an amount ranging from about 0.01 to 3 parts by weight based on 100 parts by weight of the lithium-manganese-based compound.

The heat resistant polymer layer may have an average thickness ranging from about 0.002 to about 0.5 μm.

According to another aspect, a positive electrode for a rechargeable lithium ion battery may include a lithium-manganese-based compound core with a heat resistant polymer and an inorganic metal compound disposed on the lithium-manganese-based compound core. The heat resistant polymer may have a glass transition temperature (Tg) ranging from about 80 to about 400° C.

The heat resistant polymer may be selected from the group consisting of a polyamide (PA) resin, a polyimide (PI) resin, a polyamideimide (PAI) resin, a polyacrylonitrile (PAN) resin, a polysulfone (PS) resin, a polybenzimidazole (PBI) resin, a polytetrafluoroethylene (PTFE) resin, or a copolymer or combination thereof. The polyamide resin may be a wholly aromatic polyamide-based resin. The heat resistant polymer may be included in an amount ranging from about 0.01 to about 3 parts by weight based on 100 parts by weight of the lithium-manganese-based compound.

The inorganic metal compound includes as an anion an oxide, hydroxide, nitride, halide, sulfide, or a combination thereof. The inorganic metal compound includes a metal selected from the group consisting of Al, Ti, Zr, Mg, Si, Li, Zn, La, Nb, Ta, Ge, Y, Se, B, or a combination thereof. The inorganic metal compound includes $Li_{2+2x}Zn_{1-x}GeO_4$ (0<x<1), $Li_{4-3x}Ga_xGeO_4$ (0<x<1), $La_{2/3-x}Li_{3x}TiO_3$ (0.03≦x≦0.167), $La_{1/3-x}Li_{3x}TaO_3$ (0.025≦x≦0.167), $La_{1/3-x}Li_{3x}NbO_3$ (0≦x≦0.06), La 1.3$Li_{1.7}Al_{0.3}(PO_4)_3$, LiAlTa$(PO_4)_3$, LiAl$_{0.4}$Ge$_{1.6}(PO_4)_3$, $Li_{1.4}Ti_{1.6}Y_{0.4}(PO_4)_3$, $Li_2O.SeO_2.B_2O_3$, $LiCl.Li_{1.4}M_2(PO_4)_3$ (where M is Al, Ti, Ge, or mixtures thereof), $Li_xPO_yN_z$ (x=2.9, y=3.3, and z=0.46), $Li_xBO_yN_z$ (0<x<1, 0<y<1, and 0<z<1), $Li_2S.P_2O_5$, $Li_2S.SiS_2$, $Li_2S.SiS_2.Li_xMO_4$ (where M is Si, Ge, or mixtures thereof, and 0<x<1), $Li_2S.SiS_2.Li_3PO_4$, $Li_2S.SiS_2.xMSy$ (where M is Sn, Ta, Ti, or mixtures thereof, 0<x<1), $Li_2S.SiS_2.Li_3N$, $Li_3N.SiS_2$, or a combination thereof.

The heat resistant polymer is mixed with the inorganic metal compound in a ratio of about 5 to about 50 parts by weight vs. about 95 to about 50 parts by weight. When the heat resistant polymer is used with the inorganic metal compound, the layer including the heat resistant polymer and inorganic metal compound may have an average thickness ranging from about 0.002 to about 0.5 μm.

Another embodiment provides a rechargeable lithium ion battery including the positive electrode.

Accordingly, this disclosure can provide a positive electrode for a rechargeable lithium ion battery that suppresses degradation of the positive electrode, and therefore can stably maintain a lithium-manganese-based compound despite charge and discharge at a high voltage and a high temperature and can realize excellent cycle characteristics.

In addition, since elution of manganese is suppressed, degradation may also be suppressed in the separator and the negative electrode as well as the positive electrode.

Additional aspects and/or advantages of the invention will be set forth in part in the description which follows and, in part, will be obvious from the description, or may be learned by practice of the invention.

DETAILED DESCRIPTION

Reference will now be made in detail to the present embodiment of the present invention, examples of which are illustrated as described below in order to explain the present invention.

According to one embodiment, a positive electrode for a rechargeable lithium ion battery includes a lithium-manganese-based compound core and a heat resistant polymer disposed on the lithium-manganese-based compound core. The heat resistant polymer has a glass transition temperature (Tg) ranging from about 80 to about 400° C.

The lithium-manganese-based compound may have structural stability of an active material, which is determined by a reversible intercalation/deintercalation reaction of lithium ions. The lithium-manganese-based compound may be selected from the group consisting of compounds represented by the following Chemical Formulas 1 to 4, or a combination thereof.

$$Li_xMn_{1-y}M_yA_2 \quad \text{[Chemical Formula 1]}$$

$$Li_xMn_{1-y}M_yO_{2-z}X_z \quad \text{[Chemical Formula 2]}$$

$$Li_xMn_2O_{4-z}X_z \quad \text{[Chemical Formula 3]}$$

$$Li_xMn_{2-y}M'_yA_4 \quad \text{[Chemical Formula 4]}$$

In the above formulae, $0.95 \leq x \leq 1.1$, $0 \leq y \leq 0.7$, $0 \leq z \leq 0.5$, $0 \leq \alpha \leq 2$, M' is at least one element selected from the group consisting of Al, Ni, Co, Mn, Cr, Fe, Mg, Sr, V, and a rare earth element, A is at least one element selected from the group consisting of O, F, S, and P, and X is at least one element selected from the group consisting of F, S, and P.

When the lithium-manganese-based compound is used alone, manganese may be eluted into the electrolyte solution as the charge and discharge proceed. The eluted manganese component may be deposited on the surface of the negative active material, for example, a carbon material, bringing about degradation thereof from receiving electrons, promoting decomposition of the electrolyte solution through a reduction reaction on the negative active material, and increasing resistance of the battery. Accordingly, the manganese eluted on the surface of the negative active material sharply decreases the capacity for reversibility in a lithium ion battery. This eluted manganese problem may become much more severe when the battery is stored at a high temperature.

However, according to this embodiment, when the heat resistant polymer is disposed on the lithium-manganese-based compound core, manganese elution may be suppressed from a lithium-manganese-based compound on the surface of a positive electrode as well as a lithium-manganese-based compound inside the positive electrode. Accordingly, an electrolyte solution may decompose slowly, suppressing manganese elution, degradation, gas generation, and the like, and leading to excellent cycle characteristics for the lithium ion battery despite the charge and discharge occurring at a high voltage and a high temperature.

The lithium-manganese-based compound may include the heat resistant polymer having a glass transition temperature ranging from about 80 to about 400° C. on the surface of a core particle. The heat resistant polymer having a glass transition temperature ranging from about 80 to about 400° C. may be at least one polymer selected from the group consisting of, for example, a polyamide (PA) resin, a polyimide (PI) resin, a polyamideimide (PAI) resin, a polyacrylonitrile (PAN) resin, a polysulfone (PS) resin, a polybenzimidazole (PBI) resin, a polytetrafluoroethylene (PTFE) resin, or a copolymer or combination thereof. In particular, as for the glass transition temperature of the heat resistant polymer, the polyacrylonitrile (PAN) resin may have a glass transition temperature of about 87° C., the polyamideimide (PAI) resin may have a glass transition temperature of about 293° C., the polysulfone (PS) resin may have a glass transition temperature of about 185° C., and the polybenzimidazole (PBI) resin may have a glass transition temperature of about 270° C.

The polyamide resin may be a wholly aromatic polyamide-based resin. The wholly aromatic polyamide-based resin (hereinafter referred to as an aramid resin) may without limitation include poly(phenyleneterephthalamide), poly(benzamide), poly(4,4'-benzanilidoterephthalamide), poly(phenylene-4,4'-biphenylene dicarbonic acid amide), poly (phenylene-2,6-naphthalenedicarbonic acid amide), poly(2-chloro-phenyleneterephthalamide), a phenyleneterephthalamide/2,6-chlorophenyleneterephthalamide multipolymer, and the like.

The aramid resin may have a melting point of about 180° C. or higher, and has excellent heat resistance. The aramid resin may have meta or para optical characteristics, and may be used singularly or as a combination of two or more.

When the heat resistant polymer is disposed on the surface of the lithium-manganese-based compound core, for example, elution of manganese may be suppressed. Accordingly, degradation due to elution of manganese may be suppressed from the positive electrode as well as the separator and the negative electrode. Accordingly, a rechargeable lithium ion battery may have improved cycle characteristics even at a high voltage and high temperature.

There is no single method of disposing the heat resistant polymer having a glass transition temperature ranging from about 80 to about 400° C. on the surface of the lithium-manganese-based compound core. For example, the method may include a mechanical alloy method of mechanically grinding and combining the lithium-manganese-based compound core and the heat resistant polymer, a dry-method of mixing and heating the lithium-manganese-based compound core and the heat resistant polymer or the inorganic metal compound; and a wet-method of dipping the lithium-manganese-based compound core in a coating liquid including the heat resistant polymer or the inorganic metal compound.

The heat resistant polymer may be used in an amount ranging from about 0.01 to about 3 parts by weight based on 100 parts by weight of the lithium-manganese-based compound. When the heat resistant polymer is used within the range, it may improve heat resistance and facilitate uniform coating of the inorganic metal compound on the surface of an active material.

The heat resistant polymer disposed on the surface of the lithium-manganese-based compound core may be present in a layer having a thickness ranging from about 0.002 to about 0.5 μm. When the layer has a thickness within the range, the heat resistant polymer may be continuously coated on the core of the lithium-manganese-based compound, and thereby bring about uniform heat resistance characteristics.

According to one embodiment, an inorganic metal compound as well as the heat resistant polymer having a glass transition temperature ranging from about 80 to about 400° C. may be coated on the surface of the lithium-manganese-based compound core particle.

The lithium-manganese-based compound and the heat resistant polymer having a glass transition temperature ranging from about 80 to about 400° C. may be the same as aforementioned, and is not illustrated again here.

The inorganic metal compound may include at least one anion selected from the group consisting of an oxide, hydroxide, nitride, halide, and sulfide; and at least one metal element selected from the group consisting of Al, Ti, Zr, Mg, Si, Li, Zn, La, Nb, Ta, Ge, Y, Se, Q or a combination thereof. Since the inorganic metal compound has excellent heat resistance and improves the electrolyte solution impregnation property, it may simultaneously improve heat resistance and ion conductivity when it is used with the inorganic metal compound.

The inorganic metal compound may be selected from the group consisting of, for example, $Li_{2x+2x}Zn_{1-x}GeO_4$ ($0<x<1$), $Li_{4-3x}Ga_xGeO_4$($0<x<1$), $La_{2/3-x}Li_{3x}TiO_3$ ($0.03 \leq x \leq 0.167$), $La_{1/3-x}Li_{3x}TaO_3$ ($0.025 \leq x \leq 0.167$), $La_{1/3-x}Li_{3x}NbO_3$ ($0 \leq x \leq 0.06$), $La_{1.3}Li_{1.7}Al_{0.3}(PO_4)_3$, $LiAlTa(PO_4)_3$, $LiAl_{0.4}Ge_{1.6}(PO_4)_3$, $Li_{1.4}Ti_{1.6}Y_{0.4}(PO_4)_3$, $Li_2O.SeO_2.B_2O_3$, $LiCl.Li_{1.4}M_2(PO_4)_3$ (where M is Al, Ti, Ge, or a mixture thereof), $Li_xPO_yN_z$ (where x=2.9, y=3.3, and z=0.46), $Li_{x^-}BO_yN_z$ (where $0<x<1$, $0<y<1$, and $0<z<1$), $Li_2S.P_2O_5$, $Li_2S.SiS_2$, $Li_2S.SiS_2.Li_xMO_4$ (where M is Si, P, Ge, or a mixture thereof, and $0<x<1$), $Li_2S.SiS_2.Li_3PO_4$, $Li_2S.SiS_2.xMS_y$ (where M is Sn, Ta, Ti, or a mixture thereof, and $0<x<1$), $Li_2S.SiS_2.Li_3N$, $Li_3N.SiS_2$, or a combination thereof.

The heat resistant polymer and the inorganic metal compound are mixed together in a ratio of about 5 to about 50 parts by weight vs. about 95 to about 50 parts by weight. In another embodiment, the ratio may be in a range of about 10 to about 30 parts by weight vs. about 90 to about 70 parts by weight, but in still another embodiment, they are mixed in a ratio of about 15 to about 25 parts by weight vs. about 85 to about 75 parts by weight. In particular, when the inorganic metal compound is included within these ranges, the inorganic metal compound may prevent the area of the coating layer on the core of the lithium-manganese-based compound from becoming too dense, thereby improving performance of a rechargeable lithium ion battery. In addition, the inorganic metal compound may improve ion conductivity and heat resistant effects as well as the impregnation effect of an electrolyte solution.

There is no single method for disposing the heat resistant polymer and the inorganic metal compound on the core of the lithium-manganese-based compound. For example, the method may include a mechanical alloy method of mechanically grinding and combining the lithium-manganese-based compound core and the heat resistant polymer or the inorganic metal compound; a dry-method of mixing and heating the lithium-manganese-based compound core and the heat resistant polymer or the inorganic metal compound; or a wet-method of dipping the lithium-manganese-based compound core in a coating liquid including the heat resistant polymer or the inorganic metal compound. In addition, after the positive active material particles are formed into a positive electrode, the positive electrode is dipped into a coating liquid including a polyamide resin or an inorganic metal compound to coat the positive active material particles therein.

In addition, a layer including the heat resistant polymer and inorganic metal compound may have a thickness ranging from about 0.002 to about 0.5 µm on the core of the lithium-manganese-based compound. When it has a thickness within the range, it may have a continuous coating effect as aforementioned, bring about uniform heat-resistant characteristics.

When a heat resistant polymer having a glass transition temperature ranging from about 80 to about 400° C. is disposed with an inorganic metal compound on the core of a lithium-manganese-based compound, the layer on the core becomes extremely thick, adversely affecting the reaction of a positive electrode and an electrolyte solution. Accordingly, the layer on the core may have an average thickness ranging from about 0.002 to about 0.5 µm, or in another embodiment, from about 0.002 to about 0.2 µm. The thickness can be measured using TEM (transmission electron microscopy). In other words, a TEM photograph may make it possible to distinguish the core of the lithium manganese-based active material from the layer of the heat resistant polymer or the heat resistant polymer and inorganic metal compound. The minimum and maximum thicknesses of the layer are measured several times, for example, measured ten times, and calculated for an average.

In addition, a heat resistant polymer having a glass transition temperature ranging from about 80 to about 400° C. or an inorganic metal compound as well as the heat resistant polymer may be coated on a positive electrode including the positive active material.

Another embodiment provides a rechargeable lithium ion battery including the positive electrode. Hereinafter, the rechargeable lithium ion battery according to this embodiment is illustrated.

According to this embodiment, a rechargeable lithium ion battery may be a coin type, a button type, a sheet type, a cylinder type, a flat type, a prismatic type, and the like. The rechargeable lithium ion battery may include a positive electrode, a negative electrode, an electrolyte, a separator, and the like.

The positive electrode for a rechargeable lithium ion battery may be the same as aforementioned, and need not be illustrated again.

Examples of the negative electrode may include a graphite-based carbon material, silicon, tin, a silicon alloy, a tin alloy, silicon oxide, lithium vanadium oxide, and the like as an active material, and in particular, a compound that can be capable of being alloyed with lithium, such as silicon, tin, a silicon alloy, and a tin alloy, or silicon oxide, lithium vanadium oxide, and the like as an active material.

The graphite-based carbon material has a capacity density ranging from about 560 to about 630 mAh/cm$^3$, while silicon, tin, a silicon alloy, a tin alloy, silicon oxide, lithium vanadium oxide, and the like have a capacity density of about 850 mAh/cm$^3$ or more. These materials may bring about downsizing and high capacity of a battery. Furthermore, these negative active materials may be used singly or as a combination of two or more.

The positive and negative electrodes may be prepared by adding an additive that is appropriately selected from the group consisting of an electrically conductive material, a binder, a filler, a dispersing agent, and an ionic electrically conductive material to the aforementioned active material powder.

Examples of the electrically conductive material may include graphite, carbon black, acetylene black, ketjen black, carbon fiber, metal powder, and the like. Examples of the binder may include polytetrafluoroethylene, polyvinylidene fluoride (PVdF), polyethylene, and the like.

The positive or negative electrode may be fabricated, for example, by preparing a slurry or paste through addition of a mixture of an electrically active material with various additives to a solvent such as water, an organic solvent, and the like, coating the slurry or paste on an electrode-supporting substrate by a doctor blade method and the like, and compressing the coated slurry with a compressing roller and the like.

The electrode-supporting substrate may include a foil, a sheet, or a net made of copper, nickel, stainless steel, and the like, or a sheet or a net made of carbon fiber. On the other hand, the negative electrode may be fabricated using no electrode-supporting substrate but by pressing/compressing the electrode material into a pellet.

Examples of the electrolyte may include a non-aqueous electrolyte prepared by dissolving a lithium salt in an organic solvent, a polymer electrolyte, an inorganic solid electrolyte, a composite material of a polymer electrolyte and an inorganic solid electrolyte, and the like.

The non-aqueous electrolyte may include a cyclic carbonate such as ethylene carbonate, propylene carbonate, vinylene carbonate, and the like; a linear carbonate such as dimethyl carbonate, diethyl carbonate, methyl ethyl carbonate (ethyl methyl carbonate), and the like; γ-lactones such as γ-butyrolactone and the like; linear ethers such as 1,2-dimethoxyethane, 1,2-diethoxyethane, ethoxymethoxyethane, and the like; cyclic ethers such as tetrahydrofuran; and nitriles such as acetonitrile and the like as a solvent. These solvents may be used singly or as a combination of two or more.

The non-aqueous electrolyte may include a lithium salt as a solute, for example, $LiAsF_6$, $LiBF_4$, $LiPF_6$, $LiAlCl_4$, $LiClO_4$, $LiCF_3SO_3$, $LiSbF_6$, $LiSCN$, $LiCl$, $LiC_6H_5SO_3$, $LiN(CF_3SO_2)_2$, $LiC(CF_3SO_2)_3$, $LiC_4P_9SO_3$, and the like.

Examples of the separator may include a porous film made of a polyolefin such as polypropylene, polyethylene, or the like. In addition, a polyamide layer may be disposed on the surface of the porous film. This polyamide layer may include an inorganic metal compound.

Hereinafter, examples and comparative examples of this disclosure are illustrated. These following examples are illustrated in more detail as exemplary embodiments, but this disclosure is not limited thereto.

Example 1

0.25 wt % of a polyimide (PI) resin was dissolved in N-methyl-2-pyrrolidone (NMP), and about 94.75 wt % of $LiMn_2O_4$ having a particle size of about 10 μm was added thereto. The resulting mixture was agitated with an agitator. Next, it was filtered to separate the solid from the solution. The solid was vacuum-dried at 160° C. The $LiMn_2O_4$ included a 0.005 μm-thick layer on the core. The solid was mixed with acetylene black and polyvinylidene fluoride (PVdF) in a ratio of 94:3:3 to prepare a positive active material slurry. The slurry was coated on an aluminum substrate, thus fabricating a positive electrode.

For the negative electrode, about 3 wt % of graphite powder and 3 wt % of polyvinylidene fluoride (PVdF) as a binder were added to N-methyl-2-pyrrolidone to prepare a negative active material slurry. The negative active material slurry was coated on a copper foil as a negative electrode current collector, fabricating a negative electrode.

Then, polypropylene as a separator was disposed between the positive and negative electrodes, and a non-aqueous electrolyte was injected therein, fabricating a coin-type rechargeable lithium ion battery cell. The non-aqueous electrolyte was prepared by dissolving $LiPF_6$ in a concentration of 1.50 mol/L in a solvent of ethylene carbonate and diethyl carbonate mixed in a ratio of 3:7.

Example 2

PI, a heat resistant polymer, and $LiAlTa(PO_4)_3$, an inorganic metal compound, were mixed in a weight ratio 1:3. The mixture was coated on the surface of an $LiMn_2O_4$ particle. Next, a positive electrode was fabricated according to the same method as in Example 1. The positive electrode was used to fabricate a rechargeable lithium ion battery cell according to the same method as in Example 1.

Example 3

A rechargeable lithium ion battery cell was fabricated according to the same method as in Example 1 by including a positive electrode prepared by coating PI, a heat resistant polymer, on the surface of an $LiNi_{0.5}Co_{0.2}Mn_{0.3}O_2$ particle.

Example 4

A rechargeable lithium ion battery cell was fabricated according to the same method as in Example 1 by including a positive electrode prepared by mixing PI, a heat resistant polymer, and $LiAlTa(PO_4)_3$, an inorganic metal compound, in a weight ratio of 1:3 and coating the mixture on the surface of an $LiNi_{0.5}Co_{0.2}Mn_{0.3}O_2$ particle.

Comparative Example 1

A rechargeable lithium ion battery cell was fabricated by including a positive electrode prepared by mixing $LiMn_2O_4$, acetylene black as a carbon-based conductive material, and a PVdF binder in a ratio of 94:3:3 into a slurry and coating the slurry on analuminum substrate according to the same method as in Example 1.

Comparative Example 2

A rechargeable lithium ion battery cell was fabricated by including a positive electrode prepared by mixing $LiNi_{0.5}Co_{0.2}Mn_{0.3}O_2$, acetylene black as a carbon-based conductive material, and a PVdF binder in a ratio of 94:3:3 into a slurry and coating the slurry on an aluminum substrate according to the same method as in Example 1.

Battery Cell Performance Evaluation

The coin-type rechargeable lithium ion battery cells according to Examples 1 to 4 and Comparative Examples 1 and 2 were charged and discharged. The charge and discharge experiment was performed once with a current density of 0.1 C, a charging cut-off voltage of 4.3 V (Li/Li$^+$), and a discharging cut-off voltage of 3.0 V (Li/Li$^+$).

Next, the coin-type rechargeable lithium ion battery cells were respectively charged and discharged once at a charge and discharge current density of 0.2 C and 0.5 C under the aforementioned charge and discharge cut-off voltage conditions, and then 50 times at a current density of 1.0 C. These charge and discharge experiments were all performed in a 60° C. high temperature chamber.

All the charges and discharges were performed with a constant current. After the 50 cycle experiment, the first cycle discharge capacity (initial capacity) and charge and discharge efficiency (discharge capacity/charge capacity, initial efficiency) were calculated. In addition, the capacity retention was calculated through a capacity ratio (50th/1st) by dividing the 50th cycle discharge capacity by 0.1 C of the first cycle discharge capacity. Each binder composition was evaluated by fabricating more than three coin-type rechargeable lithium ion battery cells and calculating the average value. The results are provided in the following Table 1.

TABLE 1

|  | Initial capacity (mAh/g) | Initial discharge capacity efficiency (%) | 50$^{th}$ cycle capacity retention (%) |
|---|---|---|---|
| Example 1 | 115.9 | 80.6 | 82.6 |
| Example 2 | 117.2 | 80.5 | 88.1 |
| Comparative Example 1 | 121.9 | 71.8 | 54.5 |
| Example 3 | 158.2 | 88.6 | 89.4 |
| Example 4 | 156.2 | 88.2 | 92.1 |
| Comparative Example 2 | 160.4 | 87.5 | 80.9 |

As shown in Table 1, rechargeable lithium ion battery cells fabricated by coating a lithium manganese-based oxide particle with an inorganic metal compound as well as a heat resistant polymer having a glass transition temperature ($T_g$) ranging from 80 to 400° C. or the heat resistant polymer according to Examples 1 to 4 had excellent performance compared with the ones according to Comparative Examples 1 and 2.

Specifically, compared with the rechargeable lithium ion battery cells including $LiMn_2O_4$ as a lithium manganese-based compound core according to Examples 1 and 2 and Comparative Example 1, the one including a heat resistant polymer on the surface of an $LiMn_2O_4$ particle according to Example 1 and the one including a heat resistant polymer and an inorganic metal compound on the surface of a $LiMn_2O_4$ particle according to Example 2 had about 30% higher capacity retention than the one including only $LiMn_2O_4$ according to Comparative Example 1.

In addition, compared with Examples 3 and 4 and Comparative Example 2 including $LiNi_{0.5}Co_{0.2}Mn_{0.3}O_2$ as a lithium manganese-based compound core, rechargeable lithium ion battery cells including a heat resistant polymer coated on the surface of an $LiNi_{0.5}Co_{0.2}Mn_{0.3}O_2$ particle and Example 4 including a heat resistant polymer and an inorganic metal compound coated on the surface of a $LiNi_{0.5}Co_{0.2}Mn_{0.3}O_2$ particle had about 10% higher capacity retention than Comparative Example 2 including only $LiNi_{0.5}Co_{0.2}Mn_{0.3}O_2$.

Therefore, from the examples and comparative examples, when a rechargeable lithium battery was fabricated by using a positive active material including a heat resistant polymer or both a heat resistant polymer and an inorganic metal compound on the core of the lithium manganese-base compound, the lithium manganese-base compound had the effect of suppressing manganese elution, and thereby improved battery performance.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A positive electrode for a rechargeable lithium ion battery comprising:
a lithium-manganese-based compound core; and
a polymer disposed on the lithium-manganese-based compound core,
wherein the polymer has a glass transition temperature ($T_g$) ranging from about 80 to about 400° C. and is selected from the group consisting of a polyamide (PA) resin, a polyimide (PI) resin, a polyamideimide (PAI) resin, a polysulfone (PS) resin, a polybenzimidazole (PBI) resin, a polytetrafluoroethylene (PTFE) resin, a copolymer thereof, and a combination thereof, and wherein the polymer is in a concentration range of about 0.01 to about 3 parts by weight based on 100 parts by weight of the lithium-manganese-based compound.

2. The positive electrode of claim 1, wherein:
the lithium-manganese-based compound is selected from at least one of the group consisting of compounds represented by the following Chemical Formulas 1 to 4, Chemical Formula 1

$$Li_xMn_{1-y}M'_yA_2$$

Chemical Formula 2

$$Li_xMn_{1-y}M'_yO_{2-z}X_z$$

Chemical Formula 3

$$Li_xMn_2O_{4-z}X_z$$

Chemical Formula 4

$$Li_xMn_{2-y}M'_yA_4$$

$0.95 \leq x \leq 1.1$, $0 \leq y \leq 0.7$,
$0 \leq z \leq 0.5$, $0 \leq \alpha \leq 2$,
M' is at least one element selected from the group consisting of Al, Ni, Co, Mn, Cr, Fe, Mg, Sr, V, and a rare earth element,
A is at least one element selected from the group consisting of O, F, S, and P, and
X is at least one element selected from the group consisting of F, S, and P.

3. The positive electrode of claim 1, wherein the polymer comprises a wholly aromatic polyamide-based resin.

4. The positive electrode of claim 3, wherein the wholly aromatic polyamide-based resin is selected from one or more of the group consisting of poly(phenyleneterephthalamide), poly(benzamide), poly(4,4'-benzanilidoterephthalamide), poly(phenylene-4,4'-biphenylene dicarbonic acid amide), poly(phenylene-2,6-naphthalenedicarbonic acid amide), poly(2-chloro-phenyleneterephthalamide), and a phenyleneterephthalamide/2,6-chlorophenyleneterephthalamide multipolymer.

5. The positive electrode of claim 3, wherein the wholly aromatic polyamide-based resin has a melting point of about 180° C. or higher.

6. A rechargeable lithium ion battery comprising the positive electrode of claim 1.

7. The positive electrode of claim 1, wherein a layer containing the polymer has an average thickness ranging from about 0.002 to about 0.5 μm.

8. A positive electrode for a rechargeable lithium ion battery comprising:
a lithium-manganese-based compound core; and
a polymer and an inorganic metal compound on the surface of the lithium-manganese-based compound core,
wherein the polymer has a glass transition temperature ranging from about 80 to about 400° C. and is selected from the group consisting of a polyamide (PA) resin, a polyimide (PI) resin, a polyamideimide (PAI) resin, a polysulfone (PS) resin, a polybenzimidazole (PBI)

resin, a polytetrafluoroethylene (PTFE) resin, a copolymer thereof, and a combination thereof.

9. The positive electrode of claim 8, wherein the polymer is in a concentration range of about 0.01 to about 3 parts by weight based on 100 parts by weight of the lithium-manganese-based compound.

10. The positive electrode of claim 8, wherein the anion of the inorganic metal compound is selected from the group consisting of an oxide, hydroxide, nitride, halide, sulfide, and a combination thereof.

11. The positive electrode of claim 8, wherein the inorganic metal compound is a metal selected from the group consisting of Al, Ti, Zr, Mg, Si, Li, Zn, La, Nb, Ta, Ge, Y, Se, B, and a combination thereof.

12. The positive electrode of claim 8, wherein the inorganic metal compound is selected from the group consisting of $Li_{2+2x}Zn_{1-x}GeO_4$ ($0<x<1$), $Li_{4-3x}Ga_xGeO_4$ ($0<x<1$), $La_{2/3-x}Li_{3x}TiO_3$ ($0.03 \leq x \leq 0.167$), $La_{1/3-x}Li_{3x}TaO_3$ ($0.0255 \leq x \leq 0.167$), $La_{1/3-x}Li_{3x}NbO_3$ ($0 \leq x \leq 0.06$), $La_{1.3}Li_{1.7}Al_{0.3}(PO_4)_3$, $LiAlTa(PO_4)_3$, $LiAl_{0.4}Ge_{1.6}(PO_4)_3$, $Li_{1.4}Ti_{1.6}Y_{0.4}(PO_4)_3$, $Li_2O.SeO_2.B_2O_3$, $LiCl.Li_{1.4}M_2(PO_4)_3$ (M is Al, Ti, Ge, or a mixture thereof), $Li_xPO_yN_z$ ($x=2.9$, $y=3.3$, and $z=0.46$), $Li_xBO_yN_z$ ($0<x<1$, $0<y<1$, and $0<z<1$), $Li_2S.P_2O_5$, $Li_2S.SiS_2$, $Li_2S.SiS_2.Li_xMO_4$ (M is Si, P, Ge, or a mixture thereof, and $0<x<1$), $Li_2S.SiS_2.Li_3PO_4$, $Li_2S.SiS_2.Li_3N$, $Li_3N.SiS_2$, and a combination thereof.

13. The positive electrode of claim 8, wherein the polymer and the inorganic metal compound are mixed in a ratio ranging from about 5 to about 50 parts by weight vs. about 95 to about 50 parts by weight.

14. The positive electrode of claim 8 wherein a layer containing the polymer and the inorganic metal compound has an average thickness ranging from about 0.002 to about 0.5 μm.

15. The positive electrode of claim 8, wherein the polymer comprises a wholly aromatic polyamide-based resin.

16. The positive electrode of claim 15, wherein the wholly aromatic polyamide-based resin is selected from one or more of the group consisting of poly(phenyleneterephthalamide), poly(benzamide), poly(4,4'-benzanilidoterephthalamide), poly(phenylene-4,4'-biphenylene dicarbonic acid amide), poly(phenylene-2,6-naphthalenedicarbonic acid amide), poly(2-chloro-phenyleneterephthalamide), and a phenyleneterephthalamide/2,6-chlorophenyleneterephthalamide multipolymer.

17. The positive electrode of claim 15, wherein the wholly aromatic polyamide-based resin has a melting point of about 180° C. or higher.

18. A rechargeable lithium ion battery comprising the positive electrode of claim 8.

19. The positive electrode of claim 8, wherein:
the lithium-manganese-based compound is selected from at least one of the group consisting of compounds represented by the following Chemical Formulas 1 to 4, Chemical Formula 1

$$Li_xMn_{1-y}M'_yA_2$$

Chemical Formula 2

$$Li_xMn_{1-y}M'_yO_{2-z}X_z$$

Chemical Formula 3

$$Li_xMn_2O_{4-z}X_z$$

Chemical Formula 4

$$Li_xMn_{2-y}M'_yA_4$$

wherein $0.95 \leq x \leq 1.1$, $0 \leq y \leq 0.7$,
wherein $0 \leq z \leq 0.5$,
M' is at least one element selected from the group consisting of Al, Ni, Co, Mn, Cr, Fe, Mg, Sr, V, and a rare earth element,
A is at least one element selected from the group consisting of O, F, S, and P, and
X is at least one element selected from the group consisting of F, S, and P.

* * * * *

UNITED STATES PATENT AND TRADEMARK OFFICE
CERTIFICATE OF CORRECTION

Page 1 of 2

PATENT NO. : 8,440,351 B2
APPLICATION NO. : 12/625677
DATED : May 14, 2013
INVENTOR(S) : Won-Il Jung et al.

It is certified that error appears in the above-identified patent and that said Letters Patent is hereby corrected as shown below:

On the Title Page

Item (56) References Cited,     Delete "07/2007"

Foreign Patent Documents, line 5     Insert -- 01/2007 --

Item (57) Abstract, line 2     After "positive electrode"

Insert -- having --

In the Claims

Column 10, Claim 2, line 31     Delete "$0 \leq \alpha \leq 2$,"

Column 11, Claim 12, line 19     Delete "$(0.0255 \leq x \leq 0.167)$,"

Insert -- $(0.025 \leq x \leq 0.167)$, --

Column 11, Claim 12, line 21     Delete "$Li_2O.SeO_2.B_2O_3$,"

Insert -- $Li_2O \cdot SeO_2 \cdot B_2O_3$, --

Column 11, Claim 12, line 21     Delete "$LiCl.Li_{1.4}M_2(PO_4)_3$"

Insert -- $LiCl \cdot Li_{1.4}M_2(PO_4)_3$ --

Column 11, Claim 12, line 24     Delete "$Li_2S.P_2O_5$,"

Insert -- $Li_2S \cdot P_2O_5$, --

Signed and Sealed this
Second Day of February, 2016

Michelle K. Lee
*Director of the United States Patent and Trademark Office*

CERTIFICATE OF CORRECTION (continued)
U.S. Pat. No. 8,440,351 B2

In the Claims (continued)

| | |
|---|---|
| Column 11, Claim 12, line 24 | Delete "$Li_2S.SiS_2,$" |
| | Insert -- $Li_2S \cdot SiS_2,$ -- |
| | |
| Column 11, Claim 12, line 24 | Delete "$Li_2S.SiS_2.Li_xMO_4$" |
| | Insert -- $Li_2S \cdot SiS_2 \cdot Li_xMO_4$ -- |
| | |
| Column 11, Claim 12, line 25 | Delete "$Li_2S.SiS_2.Li_3PO_4,$" |
| | Insert -- $Li_2S \cdot SiS_2 \cdot Li_3PO_4,$ -- |
| | |
| Column 11, Claim 12, line 26 | Delete "$Li_2S.SiS_2.Li_3N,$" |
| | Insert -- $Li_2S \cdot SiS_2 \cdot Li_3N,$ -- |
| | |
| Column 11, Claim 12, line 26 | Delete "$Li_3N.SiS_2,$" |
| | Insert -- $Li_3N \cdot SiS_2,$ -- |
| | |
| Column 11, Claim 14, line 31 | Delete "claim 8" |
| | Insert -- claim 8, -- |
| | |
| Column 12, Claim 19, line 29 | Before "$0 \leq z \leq 0.5,$" |
| | Delete "wherein" |